(12) United States Patent
Sato et al.

(10) Patent No.: US 9,990,154 B2
(45) Date of Patent: Jun. 5, 2018

(54) SEMICONDUCTOR DEVICE

(71) Applicant: Renesas Electronics Corporation, Tokyo (JP)

(72) Inventors: Yoshikazu Sato, Tokyo (JP); Haruhiko Matsumi, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days. days.

(21) Appl. No.: 15/604,020

(22) Filed: May 24, 2017

(65) Prior Publication Data

US 2017/0262210 A1    Sep. 14, 2017

Related U.S. Application Data

(63) Continuation of application No. 14/625,940, filed on Feb. 19, 2015, now Pat. No. 9,684,466.

(30) Foreign Application Priority Data

Mar. 5, 2014    (JP) ................................ 2014-042499

(51) Int. Cl.
  *G06F 3/06*    (2006.01)
  *G06F 11/10*   (2006.01)
  (Continued)

(52) U.S. Cl.
  CPC .......... *G06F 3/0631* (2013.01); *G06F 3/0607* (2013.01); *G06F 11/1048* (2013.01);
  (Continued)

(58) Field of Classification Search
  CPC ... G06F 3/0631; G06F 3/0607; G06F 11/1048
  See application file for complete search history.

(56) References Cited

U.S. PATENT DOCUMENTS 5,390,327 A    2/1995    Lubbers
5,613,075 A  * 3/1997    Wade ................. G06F 13/1673
                                            710/100

(Continued)

FOREIGN PATENT DOCUMENTS

JP          6149735 A    5/1994
JP       2004246862 A    9/2004
(Continued)

OTHER PUBLICATIONS

Communication dated Sep. 5, 2017, from the Japanese Patent Office in counterpart application No. 2014-042499.

*Primary Examiner* — Joseph D Torres
(74) *Attorney, Agent, or Firm* — Sughrue Mion, PLLC

(57) ABSTRACT

A semiconductor device in which unwanted change in the secondary data which must be reliable is suppressed and the need for a considerable increase in the capacity of a memory unit can be avoided. Also it ensures efficient data processing by asymmetric access to the memory unit. It includes a memory unit having a first memory without an error correcting function, a second memory with an error correcting function, and a plurality of access nodes for the memories. A plurality of buses is coupled to the access nodes and a plurality of data processing modules can asymmetrically access the memory unit through the buses. The first memory stores primary data before data processing by the data processing modules, and the second memory stores secondary data after data processing by the data processing modules.

10 Claims, 12 Drawing Sheets

(51) Int. Cl.
  *G06F 11/20* (2006.01)
  *G06F 11/16* (2006.01)
  *G06F 13/28* (2006.01)
  *G06F 13/42* (2006.01)

(52) U.S. Cl.
  CPC ...... *G06F 11/1052* (2013.01); *G06F 11/1666* (2013.01); *G06F 11/2017* (2013.01); *G06F 13/28* (2013.01); *G06F 13/4221* (2013.01)

(56) References Cited

U.S. PATENT DOCUMENTS

| | | | |
|---|---|---|---|
| 5,663,721 A * | 9/1997 | Rossi | H03M 7/3084 341/106 |
| 5,682,396 A | 10/1997 | Yamamoto | |
| 5,758,050 A | 5/1998 | Brady | |
| 6,058,461 A * | 5/2000 | Lewchuk | G06F 13/18 711/137 |
| 6,208,772 B1 * | 3/2001 | Wilt | G06F 13/4027 382/303 |
| 6,212,631 B1 | 4/2001 | Springer | |
| 6,240,503 B1 * | 5/2001 | Witt | G06F 9/30101 711/200 |
| 6,240,506 B1 * | 5/2001 | Miller | G06F 9/30152 712/205 |
| 6,243,827 B1 | 6/2001 | Renner, Jr. | |
| 6,317,813 B1 * | 11/2001 | Su | G06F 13/18 711/151 |
| 6,338,108 B1 * | 1/2002 | Motomura | G06F 13/4243 710/110 |
| 6,526,477 B1 * | 2/2003 | Yuan | G06F 3/061 710/52 |
| 6,636,959 B1 * | 10/2003 | Keller | G06F 9/3806 712/204 |
| 6,867,780 B1 | 3/2005 | Kirk | |
| 7,032,046 B2 | 4/2006 | Horii et al. | |
| 7,620,875 B1 | 11/2009 | Nelson | |
| 7,958,433 B1 | 6/2011 | Yoon | |
| 8,826,099 B2 | 9/2014 | Hara | |
| 8,935,566 B2 | 1/2015 | Matsui | |
| 2002/0087803 A1 * | 7/2002 | Jones | G06F 12/0835 711/138 |
| 2004/0054857 A1 * | 3/2004 | Nowshadi | G06F 9/5011 711/153 |
| 2004/0181652 A1 * | 9/2004 | Ahmed | G06F 9/30036 712/215 |
| 2005/0114729 A1 | 5/2005 | Nielsen | |
| 2006/0123320 A1 | 6/2006 | Vogt | |
| 2006/0137903 A1 | 6/2006 | Sprietsma | |
| 2006/0139983 A1 | 6/2006 | Sprietsma | |
| 2007/0079068 A1 | 4/2007 | Draggon | |
| 2008/0059666 A1 * | 3/2008 | Yamada | G06F 11/2236 710/106 |
| 2008/0072117 A1 | 3/2008 | Syzdek | |
| 2008/0126905 A1 * | 5/2008 | Deguchi | G06F 11/1044 714/746 |
| 2009/0249271 A1 * | 10/2009 | Yamada | G06F 11/1641 716/113 |
| 2012/0166910 A1 * | 6/2012 | Baek | G06F 11/1044 714/758 |
| 2013/0042053 A1 | 2/2013 | Huang | |
| 2013/0104001 A1 | 4/2013 | Nakanishi | |
| 2013/0104002 A1 | 4/2013 | Hara | |
| 2013/0262958 A1 | 10/2013 | Ruggiero | |
| 2013/0311849 A1 | 11/2013 | Miyachi et al. | |
| 2014/0157043 A1 | 6/2014 | Ruggiero | |
| 2014/0258811 A1 * | 9/2014 | Liu | G06F 11/1044 714/766 |

FOREIGN PATENT DOCUMENTS

| | | |
|---|---|---|
| JP | 2008-139908 A | 6/2008 |
| JP | 2013242694 A | 12/2013 |

* cited by examiner

Step4, Step1, Step2
: VIDEO DATA INPUT &
ACCELERATOR PROCESSING &
PROCESSOR PROCESSING Step5, Step1, Step3
: VIDEO DATA INPUT &
ACCELERATOR PROCESSING &
PROCESSOR PROCESSING
RESULT STORAGE

SEMICONDUCTOR DEVICE

CROSS-REFERENCE TO RELATED APPLICATIONS

This is a Continuation of U.S. patent application Ser. No. 14/625,940, filed Feb. 19, 2015, which claims priority of Japanese Patent Application No. 2014-042499, filed Mar. 5, 2014. The contents of all of which are incorporated herein by reference in their entirety.

BACKGROUND

The present invention relates to semiconductor devices for data processing in which a memory with an error correcting function is mounted, and more particularly to technology for multi-processor systems which perform image processing.

One method of preventing unwanted change in stored data due to cosmic rays, etc. is to add an error correcting function using an error correcting code to the memory. An example of the use of an error correcting function in a memory is given in Japanese Unexamined Patent Application Publication No. 2008-139908. In order to implement a function to correct an error of 1 bit, it is necessary to add an error correcting code of 8 bits. Therefore, when an error correcting code is used, the memory capacity must be increased to compensate for the additional memory required for the error correcting code. For example, in the case of image recognition or speech processing in which a large volume of data is entered and sequentially processed repeatedly, if the error correcting function is applied to all data storage areas, the data storage capacity would have to be increased excessively and the access speed would decrease. Conversely, if the error correcting function is not applied at all, the reliability of data processing would decline. One solution to this problem may be that one memory area has an error correcting function and the other memory area does not have an error correcting function as described in Japanese Unexamined Patent Application Publication No. 2008-139908.

SUMMARY

The present inventors explored how to use both the memory areas in order to improve the data processing efficiency when one memory area has an error correcting function and the other memory area does not have an error correcting function. For example, the present inventors studied a case in which a large volume of data is entered and sequentially processed repeatedly as in the case of image recognition or speech processing. From this study it has been found that when a multiprocessor is used to process data from input of sequentially supplied data to acquisition of final processing result in a pipeline manner, from the viewpoint of data processing efficiency it is effective to use a memory area with an error correcting function or a memory area without an error correcting function selectively depending on the nature of data in pipeline data processing.

The above and further objects and novel features of the invention will more fully appear from the following detailed description in this specification and the accompanying drawings.

The following is a brief description of the gist of the representative elements of the invention laid open in this application.

According to an aspect of the present invention, there is provided a semiconductor device which uses a memory unit having a first memory without an error correcting function, a second memory with an error correcting function, and a plurality of access nodes for the memories. A plurality of buses are coupled to the access nodes of the memory unit and a plurality of data processing modules can asymmetrically access the memory unit through the buses. The first memory stores primary data before data processing by the data processing modules, and the second memory stores secondary data after data processing by the data processing modules.

The following is a brief description of the advantageous effects achieved by the above aspect of the invention.

According to the invention, unwanted change in the secondary data which must be reliable is suppressed and the need for a considerable increase in the capacity of the memory unit is avoided. Data processing efficiency can be enhanced by asymmetric access to the memory unit.

DETAILED DESCRIPTION

Figure 1:
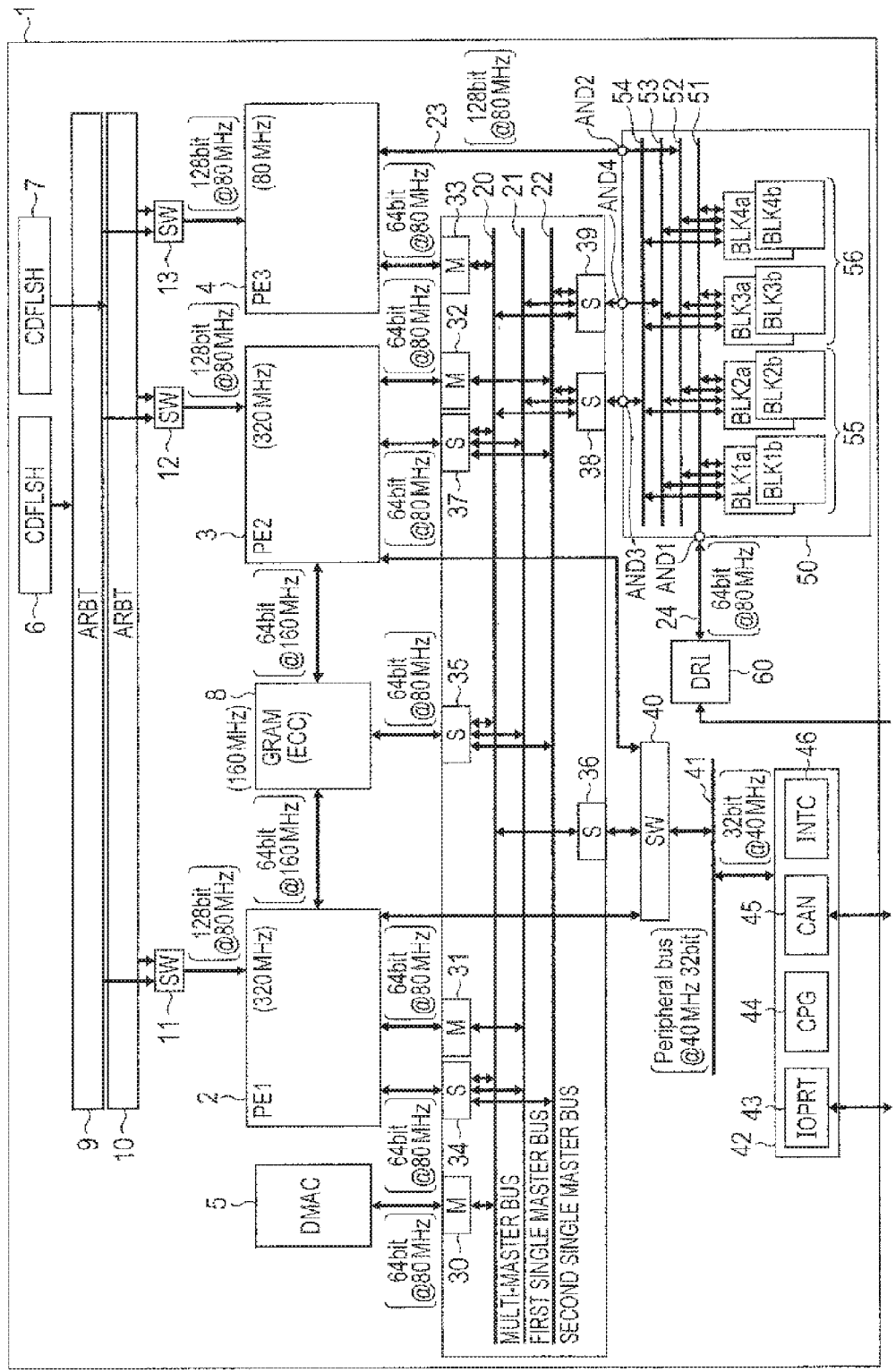
FIG. 1 is a block diagram of a microcomputer as an example of a semiconductor device according to an embodiment of the present invention.

1. Summary of the Embodiment reference signs in parentheses given in the summary of the embodiment which correspond to the reference signs in the drawings are just used to show the concepts of the constituent elements designated by these signs.

[1] <Some Part of an Asymmetrically Accessible Memory Unit has an Error Correcting Function.>

A semiconductor device (1) includes a memory unit (50), a plurality of buses (20 to 24), and a plurality of data processing modules (2 to 4). The memory unit includes a first memory (55) which does not have an error correcting function and a second memory (56) which has an error correcting function, and also includes a plurality of access anodes (AND1 to AND4) for the first memory and the second memory. The buses are coupled to the access nodes. The data processing modules each process a program and can access the memory unit through the buses asymmetrically. The first memory is designed as an area for storing primary data before data processing by the data processing modules and the second memory is designed as an area for storing secondary data after data processing by the data processing modules.

Accordingly, primary data is stored in the area without an error correcting function of the asymmetrically accessible memory unit and secondary data, such as intermediate data obtained by processing the stored primary data by the data processing modules or final processing result data obtained by processing the intermediate data, is stored in the memory area with an error correcting function so that unwanted change in the secondary data which must be reliable is suppressed. In addition, since the memory area without an error correcting function is used to store primary data which is less influenced by unwanted change in data, the need for a considerable increase in the capacity of the memory unit can be avoided. Since the plural data processing modules can access the memory unit asymmetrically through the plural access nodes, data processing efficiency can be improved by performing the processing steps from input of sequentially supplied data to acquisition of final processing result, using a so-called multiprocessor in a pipeline manner.

[2] <Local Bus for Each Access Node>

In connection with (1) above, the memory unit includes a plurality of memory local buses (51 to 54) which are each used for a specific one of the access nodes and each of the memory local buses is coupled to the first memory and the second memory.

Consequently, each memory local bus can access the first memory and the second memory in parallel.

[3] <DRI>

In connection with (2) above, the semiconductor device includes a direct memory input circuit (60) which performs control to write data supplied from outside the semiconductor device in the first memory through the first memory local bus (51) among the memory local buses.

Consequently, video data or speech data can be fetched and stored directly in the first memory from an external device.

[4] <Bus for Exclusive Use by the Accelerator>

In connection with (3) above, one of the data processing modules is an accelerator (4) specialized in a specific data processing task. One of the buses is an accelerator bus which couples the accelerator to the second memory local bus (52) among the memory local buses.

Consequently, the accelerator can take the primary data stored in the second memory from the accelerator bus and process the data efficiently.

[5] <Global Buses>

In connection with (4) above, one type of bus among the buses is global buses (20 to 22). One of the data processing modules is a first data processing module (2) and another is a second data processing module (3). The global buses include a first single master bus (21) coupled to the first data processing module as a single bus mater, a second single master bus (22) coupled to the second data processing module as a single bus master, and a multi-master bus (20) coupled to the accelerator and the other bus masters as a multiple bus master. The multi-master bus, the first single master bus, and the second single master bus are each coupled to the memory local buses other than the first memory local bus and the second memory local bus, namely the third memory local bus and the fourth memory local bus.

Consequently, access to the memory unit by the direct memory input circuit through the first memory local bus, access to it by the accelerator through the first memory local bus, and access to it by the first data processing module and second data processing module through the third memory local bus and fourth memory local bus can be easily made in parallel.

[6] <Increased Width of the Buses for the Accelerator>

In connection with (5) above, the accelerator bus and the second memory local bus each have a width equivalent to an integral multiple of the number of parallel bits of each of the multi-master bus, the first single master bus, the second single master bus, the first memory local bus, the third memory local bus, and the fourth memory local bus.

This contributes to efficient data transfer of a large volume of primary data.

[7] <Input through DRI>

In connection with (4) above, the direct memory input circuit stores externally supplied first data in the first block of the first memory through the first memory local bus.

This means that primary data can be efficiently fetched through the direct memory input circuit.

[8] <Input through DRI and Output to the Accelerator>

In connection with (7) above, the direct memory input circuit further stores externally supplied second data in the second block of the first memory through the first memory local bus and concurrently the accelerator reads the first data from the first block of the first memory through the accelerator bus and the second memory local bus to enable first data processing.

Consequently, after the process in (7) above, previously fetched primary data can be supplied to the accelerator while other primary data is being fetched.

[9] <Input through DRI and Input from the Accelerator>

In connection with (8) above, the direct memory input circuit further stores the externally supplied second data in the second block of the first memory through the first memory local bus, and concurrently the accelerator further stores first intermediate result data as a result of the first data processing in the third block of the second memory through the accelerator bus and the second memory local bus.

Consequently, after the process in (8) above, the intermediate result data calculated by the accelerator can be stored from the accelerator in the second memory block while primary data is being continuously fetched.

[10] <Input through DRI and Output to the Accelerator and Output to the General Processor>

In connection with (9) above, the direct memory input circuit stores externally supplied third data in the first block of the first memory through the first memory local bus, and concurrently the accelerator further reads the second data from the second block of the first memory through the accelerator bus and the second memory local bus to enable second data processing and the first data processing module reads the first intermediate result data from the third block of the second memory through the third memory local bus and the global buses to enable third data processing.

This means that after the process in (9) above, while other primary data is being fetched, previously fetched primary data can be supplied to the accelerator and previously calculated intermediate result data can be supplied from the second memory to the data processing modules.

[11] <Input through DRI and Input from the Accelerator and Input from the General Processor>

In connection with (10) above, while the direct memory input circuit continues to store the externally supplied third data in the first block of the first memory through the first memory local bus, the accelerator further stores second intermediate result data as a result of the second data processing in the third block of the second memory through the accelerator bus and the second memory local bus and the first data processing module further stores first final result data as a result of the third data processing in the fourth block of the second memory through the third memory local bus and the global bus.

Consequently, after the process in (10) above, while primary data is continuously fetched, intermediate result data calculated by the accelerator can be supplied from the accelerator in the second memory and final result data calculated by the data processing module can be stored in the second memory.

[12] <Input through DRI and Output to the Accelerator and Output to the General Processor>

In connection with (11) above, the direct memory input circuit further stores externally supplied fourth data in the second block of the first memory through the first memory local bus, and concurrently the accelerator further reads the third data from the first block of the first memory through the accelerator bus and the second memory local bus to enable fourth data processing and the first data processing module reads the second intermediate result data from the third block of the second memory through the third memory local bus and the global buses to enable fifth data processing.

Consequently, after the process in (11) above, while other primary data is being fetched, previously fetched primary data can be supplied to the accelerator and previously calculated intermediate result data can be supplied from the second memory to the data processing module.

[13] <Input through DRI and Input from the Accelerator and Input from the General Processor>

In connection with (12) above, while the direct memory input circuit continues to store the externally supplied fourth data in the second block of the first memory through the first memory local bus, the accelerator further stores third intermediate result data as a result of the fourth data processing in the fourth block of the second memory through the accelerator bus and the second memory local bus and the first data processing module further stores second final result data as a result of the fifth data processing in the fourth block of the second memory through the third memory local bus and the global bus.

Consequently, after the process in (12) above, while primary data is continuously fetched, intermediate result data calculated by the accelerator can be stored from the accelerator in the second memory block and the final result data calculated by the data processing module can be stored in the second memory. After this, the step (10) and step (13) are repeated so that final result data according to sequentially entered new primary data can be successively obtained.

[14] <Forward Image Data Supplied from an In-Vehicle Camera>

In connection with (13) above, the first to fourth data are forward image data supplied from an in-vehicle camera.

Therefore, according to forward image data entered sequentially in time series, necessary processing tasks for a preventive safety system for collision prevention, etc. can be sequentially carried out continuously.

[15] <In-Vehicle Network Terminal>

In connection with (14) above, the semiconductor device further includes an in-vehicle network terminal interface which is coupled to the global buses, and the first data processing module or the second data processing module sequentially sends out the first final result data and second final result data sequentially stored in the fourth block of the second memory from the in-vehicle network terminal interface.

Therefore, according to forward image data entered sequentially in time series, the result of processing sequentially performed to give a collision warning can be given to an electronic device in charge of collision prevention processing through the in-vehicle network.

2. Details of the Embodiment

Next, the preferred embodiment will be described in detail.

FIG. 1 shows a microcomputer (MCU) 1 as an example of a semiconductor device according to an embodiment of the present invention. The microcomputer 1 is formed on a single semiconductor substrate of monocrystalline silicon or the like by CMOS integrated circuit manufacturing technology, though not limited thereto. Though not limited thereto, the microcomputer 1 has a special image processing function based on image recognition for a preventive safety system and is used in an ECU (electronic control unit) for the preventive safety system which is coupled to the in-vehicle network.

The microcomputer 1 includes two processors (PE1, PE2) 2 and 3 as data processing modules and one accelerator (PE3) 4, a multi-port internal data random access memory (IDRAM) 50 as a memory unit, and a plurality of buses 20 to 24 to be coupled to the IDRAM 50. The microcomputer 1 further includes (not limited to) a direct memory access controller (DMAC) 5, a general-purpose memory (GRAM) 8 as a static random access memory (SRAM), and a peripheral circuit 42.

The IDRAM 50 includes a first memory 55 without an error correcting function and a second memory 56 with an error correcting function and has a plurality of access nodes AND1, AND2, AND3, and AND4 for the first memory 55 and the second memory 56.

The IDRAM 50 has a plurality of memory local buses as a first memory local bus 51 to a fourth memory local bus 54 which are each used for a specific one of the access nodes AND1 to AND4. The memory local buses 51 to 54 are each coupled to the first memory 55 and the second memory 56. Though not limited thereto, the first memory 55 includes a first block (BLK1) BLK1a, BLK1b and a second block (BLK2) BLK2a, BLK2b which can be accessed in parallel. Similarly, the second memory 56 includes a third block (BLK3) BLK3a, BLK3b and a second block (BLK4) BLK4a, BLK4b which can be accessed in parallel. FIG. 1 shows that each block is divided into two sub-blocks designated by reference signs accompanied by suffixes a and b, but it just illustrates data divided into upper and lower parts for the sake of convenience and does not mean more than that.

The processors 2 and 3 include (not limited to) a central processing unit for fetching an instruction and executing it, a floating point arithmetic unit, a data cache, an instruction cache, and a local RAM and adopt an SIMD (single instruction multiple data) method to execute an instruction. Therefore, the processors 2 and 3 themselves have an architecture which includes a plurality of CPUs suitable for processing of data such as images. The accelerator 4 includes a central processing unit, a data cache, and a local RAM and, for example, efficiently performs specific arithmetic processing to reduce the load on the processors 2 and 3. The central processing unit of the processor 2 (3) accesses the outside through a master port 31 (32) and a local memory, etc. can access it externally through a slave port 34 (37). The central processing unit of the accelerator 4 accesses the outside through a master port 33.

The processors 2 and 3 and the accelerator 4 perform processing according to an operation program and as part of such processing, the IDRAM 50 becomes asymmetrically accessible through a plurality of buses 20 to 23. Asymmetric access means a memory access architecture in which access time (or access speed) depends on the relation between the bus master (processor 2 or 3, accelerator 4 or DMAC 5) as an access source and the access node (AND1 to AND4) as an access destination.

Though not limited thereto, in this case, for the bus (accelerator bus) 23 which couples the accelerator 4 to the access node AND2, the parallel bit count is 128 bits at a transfer speed of 80 MHz. The accelerator 4 is specialized in a specific data processing task and has an arithmetic processing function to perform that task at high speed and the accelerator bus 23 is exclusively used by the accelerator 4.

On the other hand, the buses 20 to 22 are global buses which are used by the processors 2 and 3 and DMAC 5 and their parallel bit count is 64 bits at a transfer speed of 80 MHz. The bus 20 is a multi-master bus which is coupled to a plurality of bus masters such as the accelerator 4 and DMAC 5 through the master ports 33 and 30. The bus 21 is a first single master bus which is coupled to the processor 2 as a single bus master through the master port 31. The bus 22 is a second single master bus which is coupled to the processor 3 as a single bus master through the master port 32.

As for bus slaves, the multi-master bus 20, first single master bus 21, and second single maser bus 22 are each coupled to the processor 2 through a slave port 34, to the GRAM 8 through a slave port 35, to the processor 3 through a slave port 37, to the fourth memory local bus 54 through a slave port 38, and to the third memory local bus 53 through a slave port 39.

The second memory local bus 51 is coupled to the accelerator bus 23 through the access node AND2.

The first memory local bus 51 is coupled to a direct memory input circuit (DRI) 60 through an input bus 24. The direct memory input circuit (DRI) 60 performs control to write data supplied from outside the microcomputer 1 in the first memory through the first memory local bus 51. Though not limited thereto, for the input bus 24, the parallel bit count is 64 bits at a transfer speed of 80 MHz. For the first memory local bus 51, third memory local bus 53, and fourth memory local bus 54, the parallel bit count is 64 bits at a transfer speed of 80 MHz. For the second memory local bus 52, the parallel bit count is 128 bits at a transfer speed of 80 MHz like the accelerator bus 23.

The program (software) to be executed by the processors 2 and 3 and the accelerator 4 is stored, for example, in code flash memories (CDFLSH) 6 and 7 which are electrically rewritable. The processors 2 and 3 and the accelerator 4 fetch an instruction from the code flash memories 6 and 7 in accordance with their respective program execution sequences. Here, access contention is arbitrated by an arbiter (ARBT) 9 or 10. The instruction subjected to arbitration by the arbiter 9 or 10 and read from the code flash memory 6 or 7 is returned to the source which has issued the request to fetch the instruction, through a select switch 11, 12, or 13.

The peripheral circuit 42 includes (not limited thereto) an input/output port (IOPRT) 43 for interfacing with the outside of the microcomputer 1, a clock pulse generator (CPG) 44 for generating a clock signal such as a reference clock for operation of the microcomputer 1, a controller area network interface (CAN) 45 as an in-vehicle network terminal interface, and an interrupt controller (INTC) 46. Though not limited thereto, the peripheral circuit 42 is coupled to a peripheral bus 41 and the peripheral bus 41 is accessible through a slave port 36 coupled to the processor 2 or 3 or multi-master bus 20 and the access route is selected by a select switch 40. For the peripheral bus 41, the parallel bit count is 128 bits at a transfer speed of 80 MHz. The select switch 40 also has a function as a bus bridge.

The GRAM 8 is used as a work area for the processors 2 and 3 or as a general register area. Though not limited thereto, the GRAM 8 has an error correcting function for the purpose of the reliability of data processing. The storage capacity of the GRAM 8 is relatively small, for example, at 256 kB (kilobytes) due to the nature of its usage, so its area impact on the chip area is small.

On the other hand, the IDRAM 50 is intended to be used as a data memory which stores data and intermediate data to be processed by the processors 2 and 3 and the accelerator 4 and thus its storage capacity is far larger than that of the GRAM 8 and, for example, several megabits or more. Taking this into consideration, all the storage areas of the IDRAM 50 do not have an error correcting function: part of it, or the first memory 55, does not have an error correcting function and the rest, or the second memory 56, has an error correcting function. The first memory 55 is used as an area which stores primary data before processing by the processor 2 or 3 or the accelerator 4, and the second memory 56 is used as an area which stores secondary data after processing by the processor 2 or 3 or the accelerator 4.

For example, ECC (Error Checking and Correcting) is used for the error correcting function. In this case, an error correcting code which uses a hamming code depending on the length of data to be stored is used for correction of an error. For example, when an error correcting code of 8 bits is used for data of 64 bits, an error of 1 bit can be corrected. Though not limited thereto, a logic to generate an error correcting code for written data and a logic to make an error judgment using an error correcting code for read data and make necessary error correction are provided in each of the third block BLK3a, BLK3b and the fourth block BLK4a, BLK4b.

Though not limited thereto, contention of access from access nodes AND1 to AND4 to the blocks BLK1 to BLK4 is arbitrated by bus arbiters or routers (not shown) coupled to the local buses 51 to 54. In arbitration of access contention, for a high-priority bus master, access is permitted in a non-weighted manner and for a low-priority bus master, a necessary weight cycle is inserted before permission of access.

Figure 2:
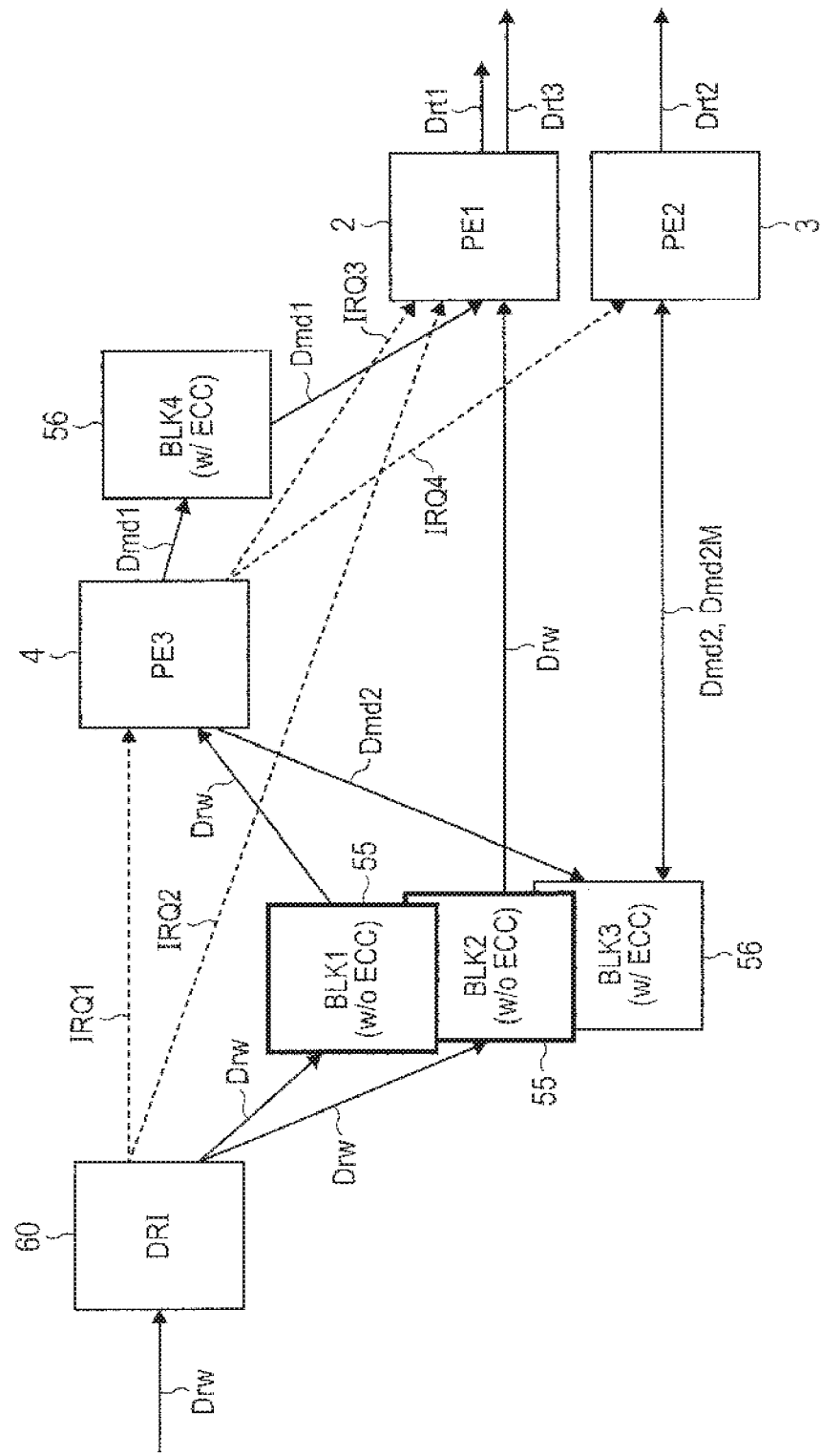
FIG. 2 is an explanatory view which illustrates an example of a data processing sequence in which a first memory and a second memory are selectively used.

FIG. 2 shows an example of a data processing sequence in which the first memory 55 and the second memory 56 are selectively used. The DRI 60 stores entered primary data Drw in the first block BLK1 (BLK1a, BLK1b) and second block BLK2 (BLK2a, BLK2b) sequentially.

When the stored data attains a given unit for processing, DRI 60 issues an interrupt request IRQ1 and in response to it the accelerator 4 reads the primary data Drw stored in the first block BLK1 of the first memory 55 and processes it in a given manner. The secondary data Dmd1 calculated by the accelerator 4 is supplied to the fourth block BLK4 of the second memory 56 and the secondary data Dmd1 and an error correcting code generated based on it are stored in the fourth block BLK4. Also the secondary data Dmd2 calculated by the accelerator 4 is supplied to the third block BLK3 of the second memory 56 and the secondary data Dmd2 and an error correcting code generated based on it are stored in the third block BLK3.

Then, the accelerator 4 issues an interrupt request IRQ3 to the processor 2 and issues an interrupt request IRQ4 to the processor 3. In response to the interrupt request IRQ3, the processor 2 makes read access to the fourth block BLK4 and makes a necessary error correction of the secondary data DMd1 stored there using an error correcting code to regenerate the secondary data Dmd1 and processes the regenerated secondary data Dmd1 in a given manner to obtain processing result data Drt1.

In response to the interrupt request IRQ4, the processor 3 makes read access to the third block BLK3 and makes a necessary error correction of the secondary data DMd2 stored there using an error correcting code to obtain the secondary data Dmd2 and processes the obtained secondary data Dmd2 in a given manner to obtain updated secondary data Dmd2M. The updated secondary data Dmd2M is again supplied to the third block BLK3 and stored there together with an appropriate error correcting code. Again the processor 3 makes read access to the third block BLK3 and makes a necessary error correction of the secondary data DMd2M stored there using the error correcting code to obtain the secondary data Dmd2M and processes the obtained secondary data Dmd2M in another given manner to obtain processing result data Drt2.

On the other hand, when the primary data Drw stored in the second block BLK2 attains a given unit for processing, DRI 60 issues an interrupt request IRQ2 and in response to it the processor 2 reads the primary data Drw stored in the second block BLK2 of the first memory 55 and processes it in a given manner to obtain processing result data Drt3.

According to the microcomputer 1, while primary data is stored in the first memory 55 without an error correcting function in the asymmetrically accessible IDRAM 50, secondary data, such as intermediate data Dmd1 and Dmd2 obtained by processing the stored primary data by the processors 2 and 3 and the accelerator 4 and final processing result data Drt1, Drt2, and Drt3 obtained by processing the intermediate data Dmd1 and Dmd2, is stored in the second memory 56 with an error correcting function, so unwanted change in the secondary data which must be reliable can be suppressed. In addition, since the first memory 55 without an error correcting function is used to store primary data which is less influenced by unwanted change in data, the need for a considerable increase in the capacity of the IDRAM 50 can be avoided. The processors 2 and 3 and the accelerator 4 can asymmetrically access the IDRAM 50 through the access nodes AND1 to AND4. Specifically, the IDRAM 50 can be accessed from the four buses through the four access nodes AND1 to AND4 and the different blocks BLK1 to BLK4 can be simultaneously accessed from the access nodes AND1 to AND4. Therefore, the process from input of sequentially supplied data Drw to acquisition of final processing result can be dealt with in a pipeline manner using the so-called multi-processor so that the data processing efficiency is improved.

Figure 3:
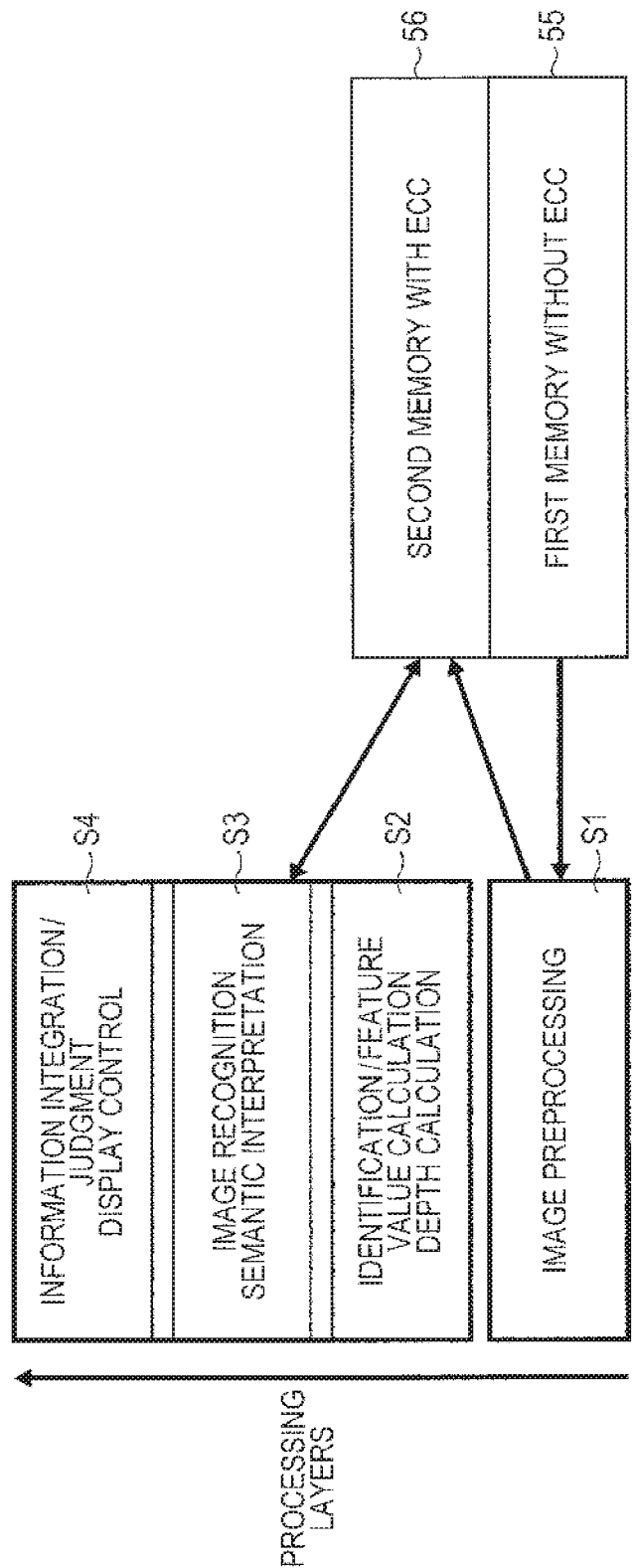
FIG. 3 is an explanatory view which illustrates an example of how primary data and secondary data are concretely processed in image processing.

FIG. 3 illustrates an example of how primary data and secondary data are concretely processed in image processing. Image preprocessing S1 is performed on the image data stored in the first memory 55 without an ECC function and the processing result is stored in the second memory 56 with an ECC function. The preprocessed data stored in the second memory 56 is subjected to identification/feature value calculation and depth calculation S2. The intermediate data obtained by these calculations is temporarily stored in the second memory 56 and when a unit of data for processing is accumulated, processing S3 for image recognition and semantic interpretation is performed. The result of processing such as image recognition is used for information integration/judgment, display control, and actuator control, etc. (S4).

Figure 4:
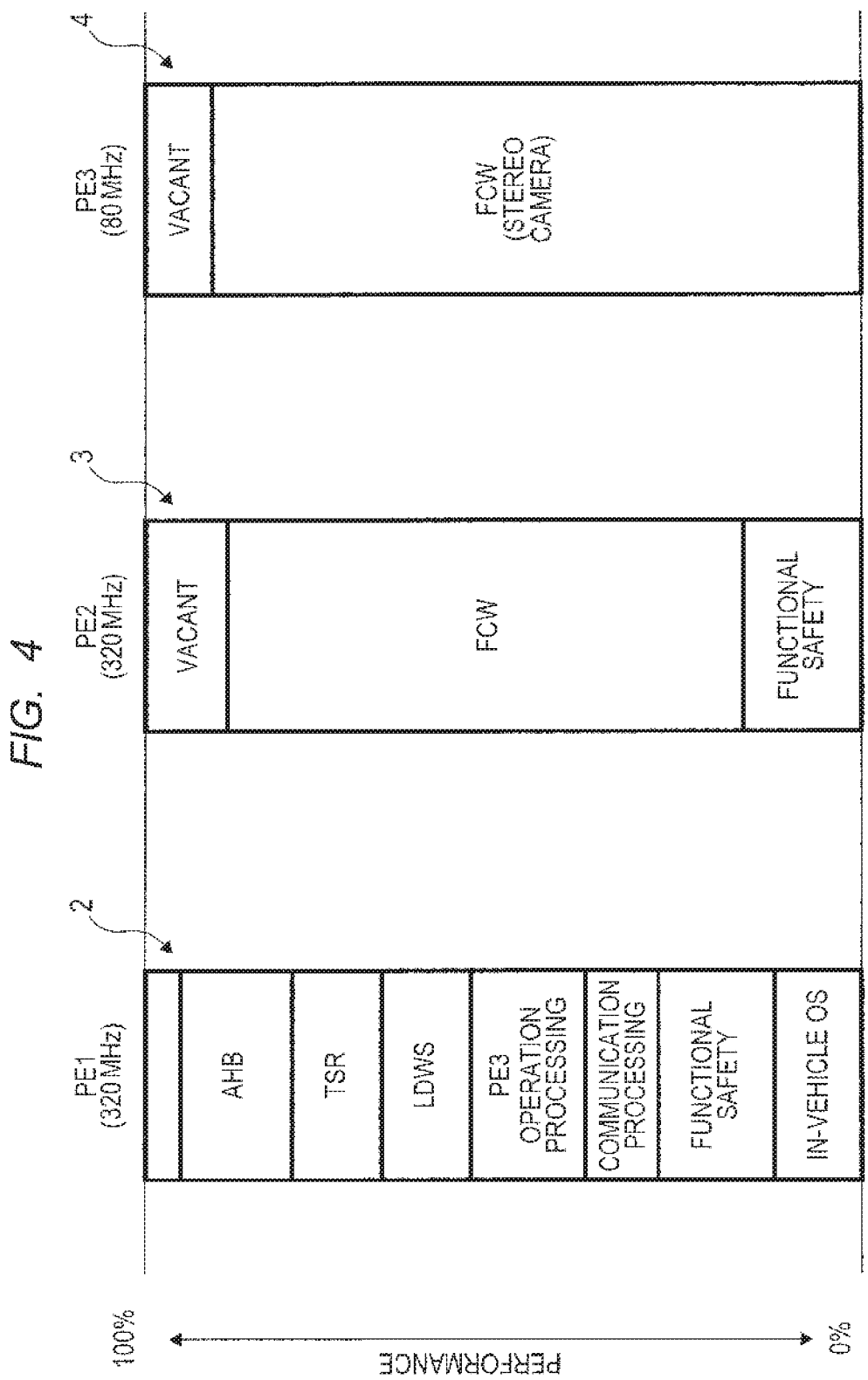
FIG. 4 is an explanatory view which illustrates an example of how the processing tasks for an in-vehicle preventive safety system based on image recognition for collision prevention, etc. are allocated to processors and an accelerator.

FIG. 4 illustrates an example of how the processing tasks for an in-vehicle preventive safety system based on image recognition for collision prevention, etc. are allocated to the processors 2 and 3 and the accelerator 4.

Here, focus is placed on the in-vehicle preventive safety system which performs processing tasks including automatic high beam control (AHB), traffic sign recognition (TSR), lane departure warning system (LDWS), and forward collision warning (FCW). The other tasks include ECU communication processing, ECU functional safety processing, ECU in-vehicle OS processing and calculation setup processing for the accelerator (PE3) 4. How these processing tasks are allocated is illustrated in FIG. 4. Particularly the load of FCW processing of image data from a stereo camera is large, so the load is shared by the processor 3 and the accelerator 4. The processing task sharing illustrated in FIG. 4 is just an example and in the period when a processor is not engaged in FCW processing, it performs another processing task or if some redundant capacity component (indicated by "vacant" in the figure) is available for data processing, it may be used for another task. What kinds of processing tasks are allocated to the processors 2 and 3 and the accelerator 4 is determined according to the type of processing task and available processing time, and task allocation is controlled by the operation programs for the tasks.

Figure 5:
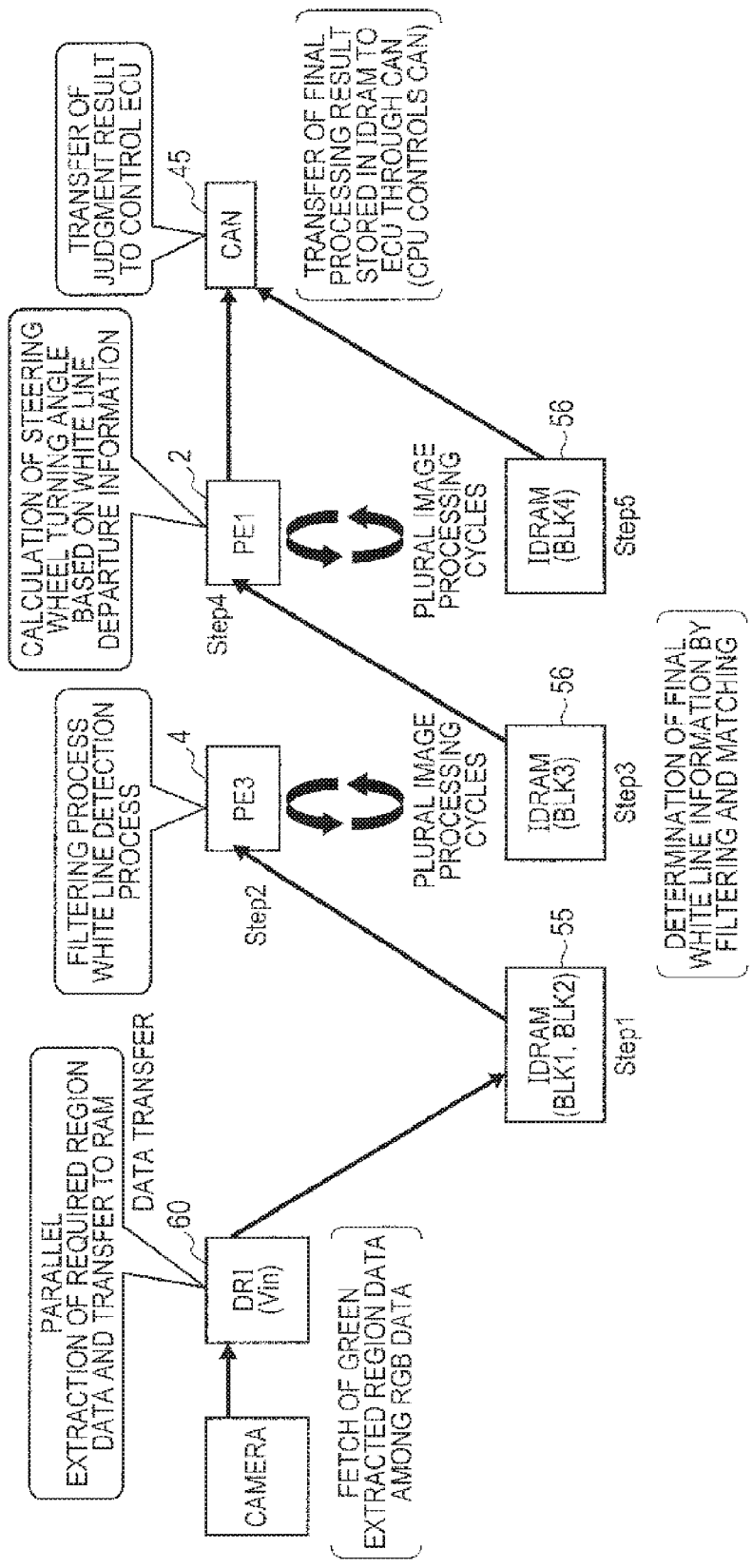
FIG. 5 is a flowchart which illustrates an example of processing by a processor and the accelerator using an IDRAM.

FIG. 5 shows an example of processing by a processor and the accelerator using the IDRAM 50. Next, how LDWS processing is performed by task allocation which is different from the task allocation in FIG. 4 will be described.

DRI 60 receives video data captured by a camera located on the front side of the vehicle and stores it in the first block BLK1 or second block BLK2 in the first memory of the IDRAM 50 sequentially (Step 1). The data stored here need not be all video data but may be only image data in the lower half of the image frame which is used for lane recognition. DRI 60 can perform this control by thinning input data.

When a unit of image data for processing (for example, image data for one frame or a plurality of frames) is accumulated, the accelerator 4 reads the image data and performs filtering and white line detection processes (Step 2) and stores the final white line information in the third block BLK3 of the second memory 56 of the IDRAM 50 (Step 3).

The processor 2 reads white line information from the third block BLK3 and calculates an appropriate steering wheel turning angle based on the information of departure from the white line (Step 4) and stores the calculated turning angle in the fourth block BLK4 of the second memory 56 of the IDRAM 50 (Step 5). The processor 2 or processor 3 controls the CAN 45 to send the turning angle information stored in the fourth block BLK4 to the ECU for control of the steering wheel.

As mentioned above, since the processors 2 and 3 and the accelerator 4 can access the IDRAM 50 in parallel or concurrently, subsequent image data can be accumulated alternately in the first block BLK1 and second BLK2 concurrently at Step 2, Step 3, Step 4, and Step 5. Similarly, Step 2 can be parallelized at Step 4 and Step 3 can be parallelized at Step 5. In other words, Step 1 to Step 5 can be carried out in a pipeline manner.

FIGS. 6 to 12 illustrate an example of asymmetric access with the IDRAM 50 in the case that Step 1 to Step 5 as shown in FIG. 5 are carried out in a pipeline manner.

Figure 6:
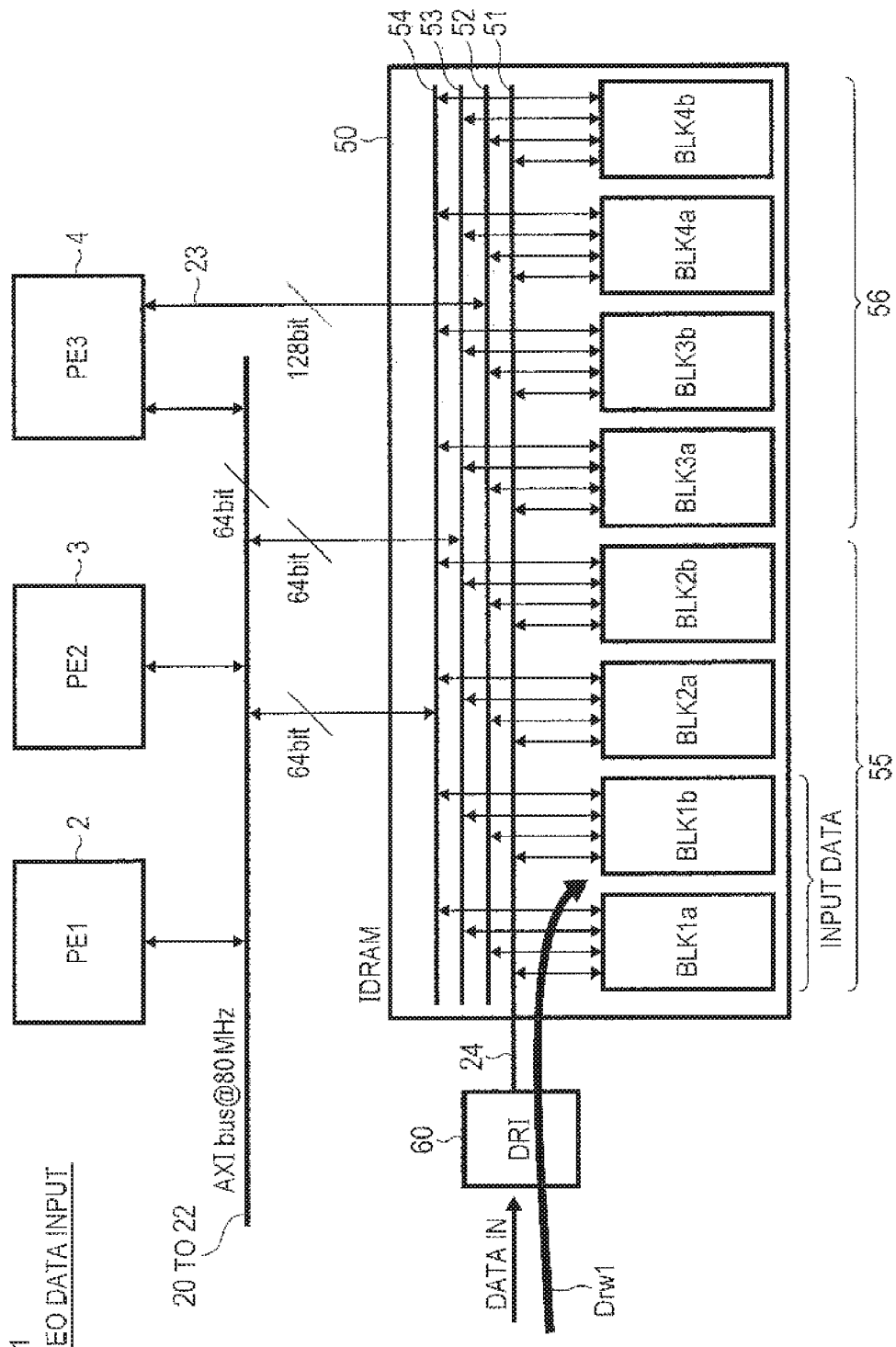
FIG. 6 is an explanatory view which illustrates a form of access with the IDRAM which corresponds to Step 1 in FIG. 5.

FIG. 6 illustrates a form of access with the IDRAM 50 which corresponds to Step 1 in FIG. 5. DRI 60 stores externally supplied image data such as video data (first data Drw1) in the first block BLK1a, BLK1b of the first memory 55 through the first memory local bus 51. This means that primary data can be fetched efficiently using DRI 60.

Figure 7:
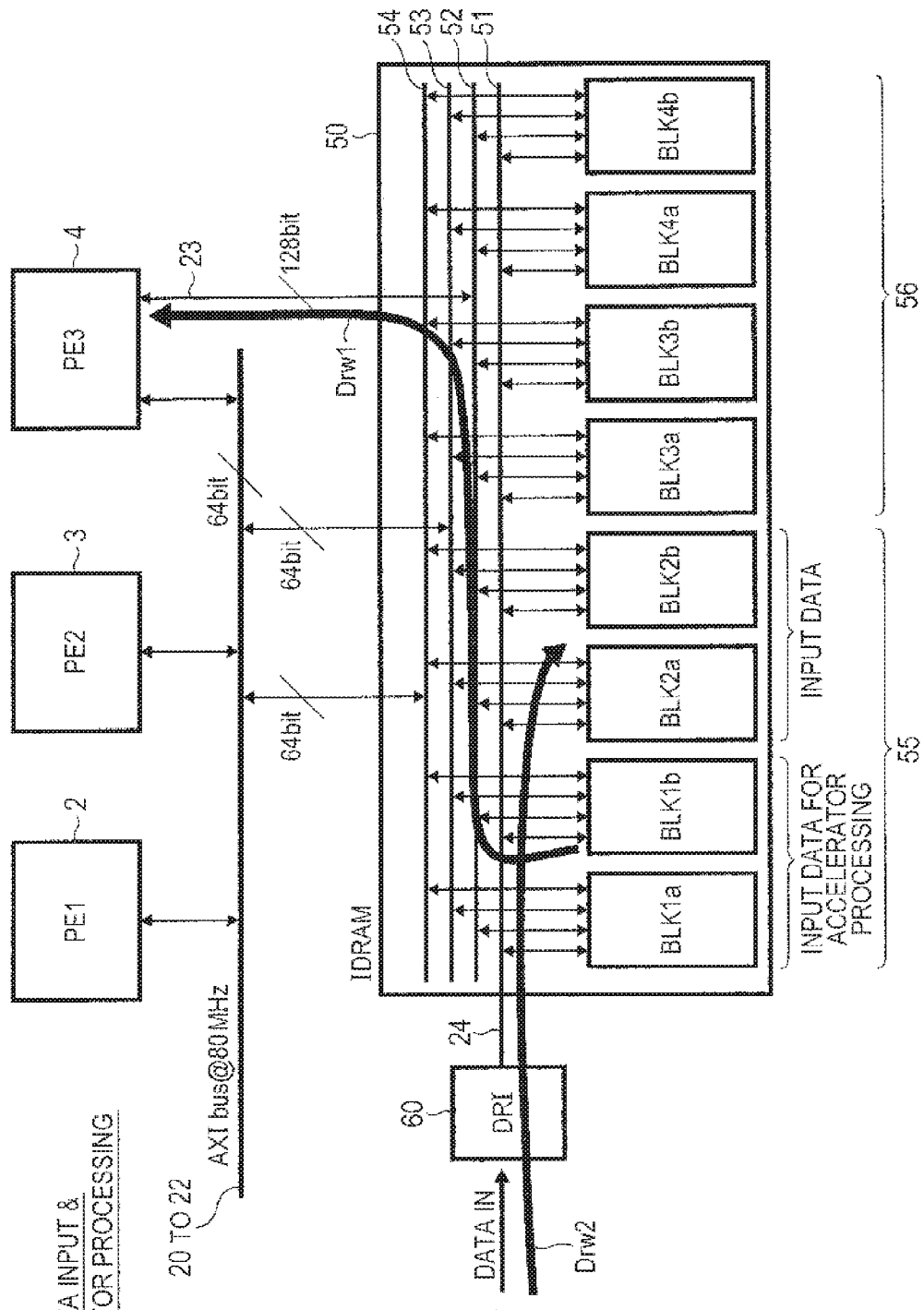
FIG. 7 is an explanatory view which illustrates a form of access with the IDRAM in the case that Step 1 and Step 2 in FIG. 5 are parallelized.

FIG. 7 illustrates a form of access with the IDRAM 50 in the case that Step 1 and Step 2 (FIG. 5) are parallelized.

DRI 60 further stores externally supplied image data such as video data (second data Drw2) in the second block BLK2a, BLK2b of the first memory 55 through the first memory local bus 51. Concurrently, the accelerator 4 reads the first data Drw1 from the first block BLK1a, BLK1b of the first memory 55 through the accelerator bus 23 and the second memory local bus 52 to enable first data processing such as filtering and white line detection processes. This means that after the process in FIG. 6, previously fetched primary data can be supplied to the accelerator 4 while other primary data is being fetched.

Figure 8:
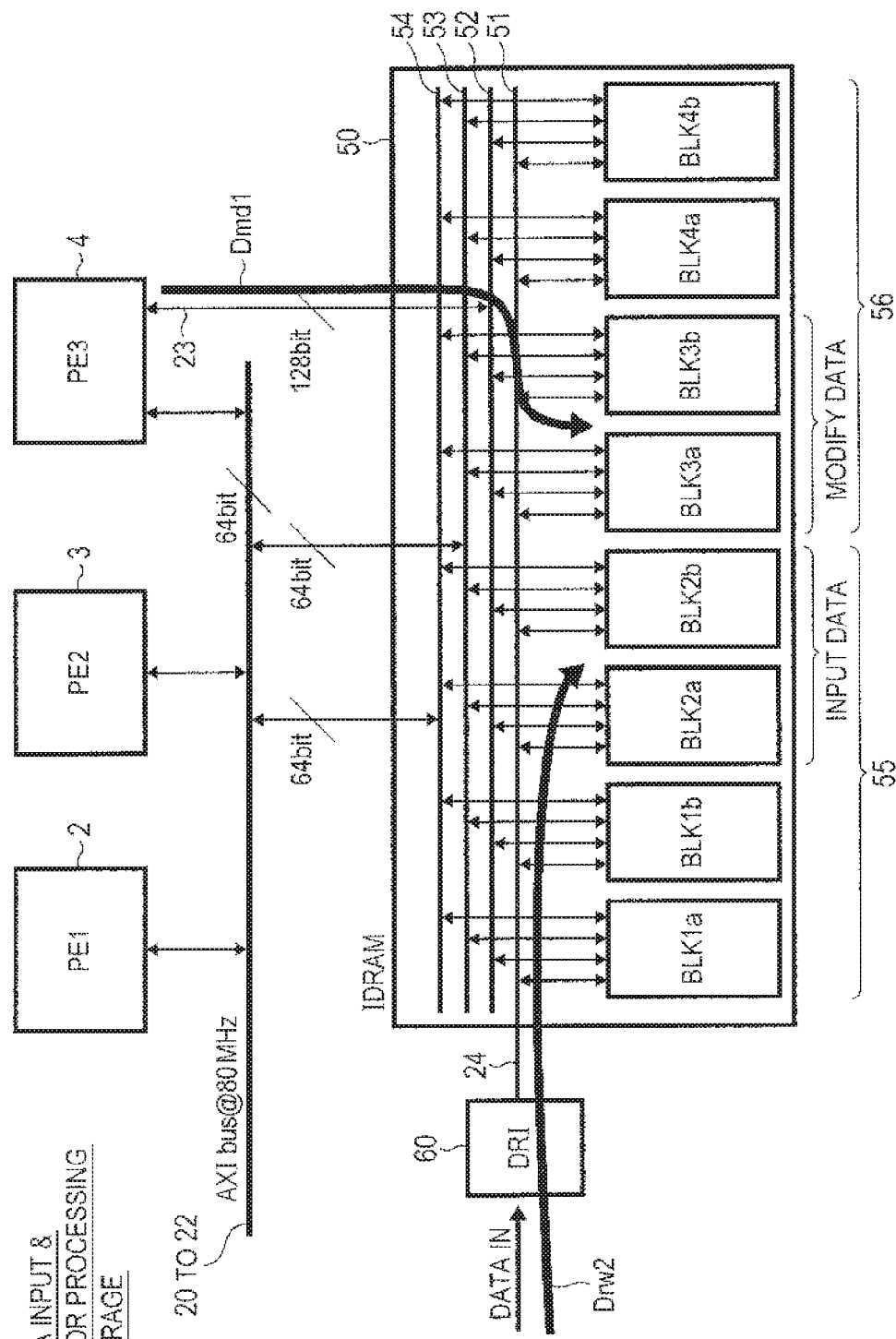
FIG. 8 is an explanatory view which illustrates a form of access with the IDRAM in the case that Step 1 and Step 3 in FIG. 5 are parallelized.

FIG. 8 illustrates a form of access with the IDRAM 50 in the case that Step 1 and Step 3 (FIG. 5) are parallelized.

While DRI 60 continues to store externally supplied second data Drw2 in the second block BLK2a, BLK2b of the first memory 55 through the first memory local bus 51, the accelerator 4 further stores first intermediate result data Dmd1 such as white line information as a result of the first data processing in the third block BLK3a, BLK3b of the second memory 56 through the accelerator bus 23 and the second memory local bus 52. This means that after the process in FIG. 7, the intermediate result data calculated by the accelerator 4 can be sent from the accelerator 4 and stored in the second memory block BLK2a, BLK2b while primary data is continuously fetched.

Figure 9:
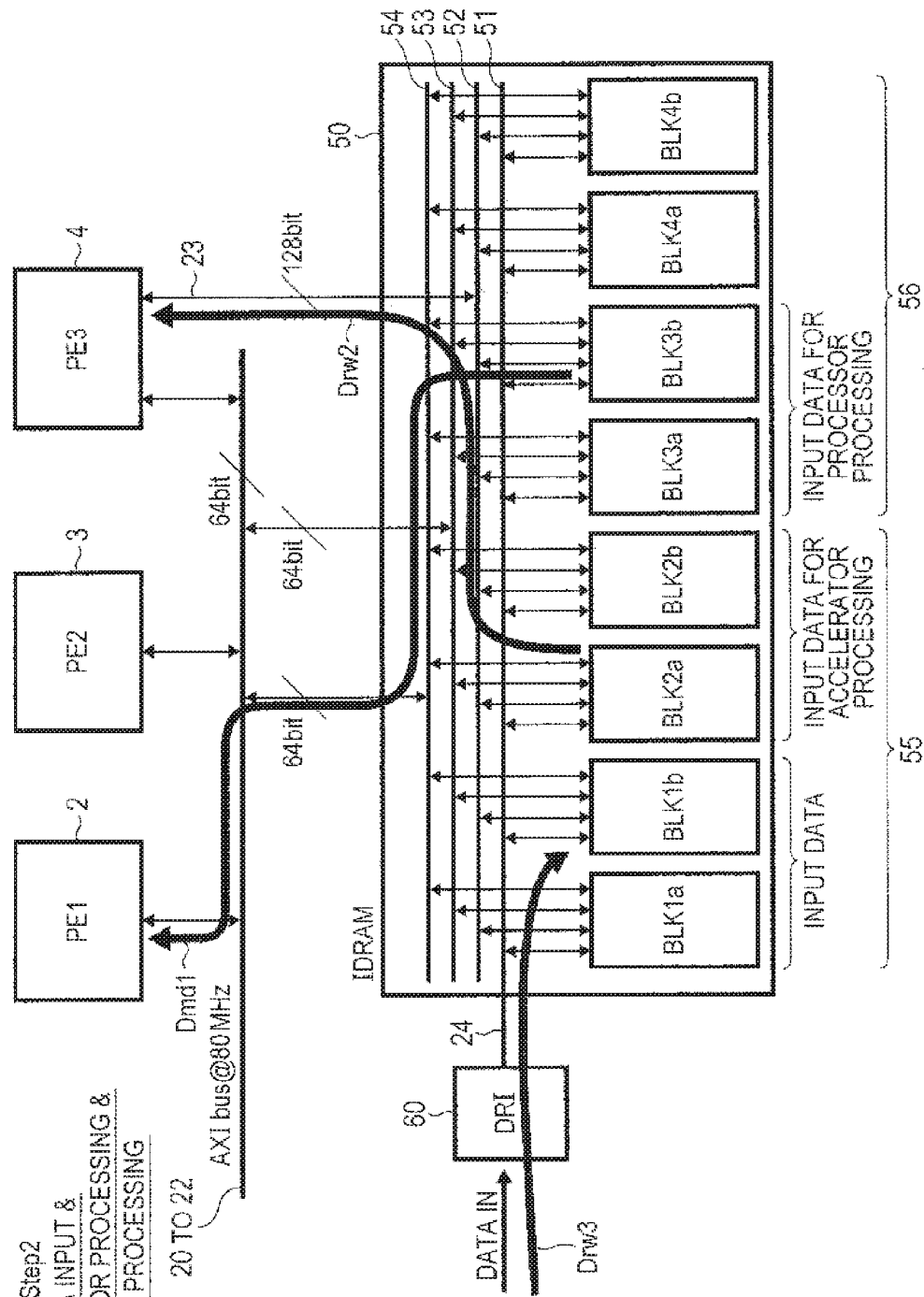
FIG. 9 is an explanatory view which illustrates a form of access with the IDRAM in the case that Step 1, Step 2, and Step 4 in FIG. 5 are parallelized.

FIG. 9 illustrates a form of access with the IDRAM 50 in the case that Step 1, Step 2, and Step 4 (FIG. 5) are parallelized.

DRI 60 further stores externally supplied third data Drw3 in the first block BLK1a, BLK1b of the first memory 55 through the first memory local bus 51, and concurrently the accelerator 4 further reads the second data Drw2 from the second block BLK2a, BLK2b of the first memory 55 through the accelerator bus 23 and the second memory local bus 52 to enable second data processing such as filtering and white line detection. At the same time, the processor 2 reads the first intermediate result data Dmd1 from the third block BLK3a, BLK3b of the second memory 56 through the third memory local bus 53 and the first single master bus 21 among the global buses to enable third data processing such as calculation of steering wheel turning angle. This means that after the process in FIG. 8, previously fetched primary data can be supplied to the accelerator 4 while other primary data is being fetched.

Figure 10:
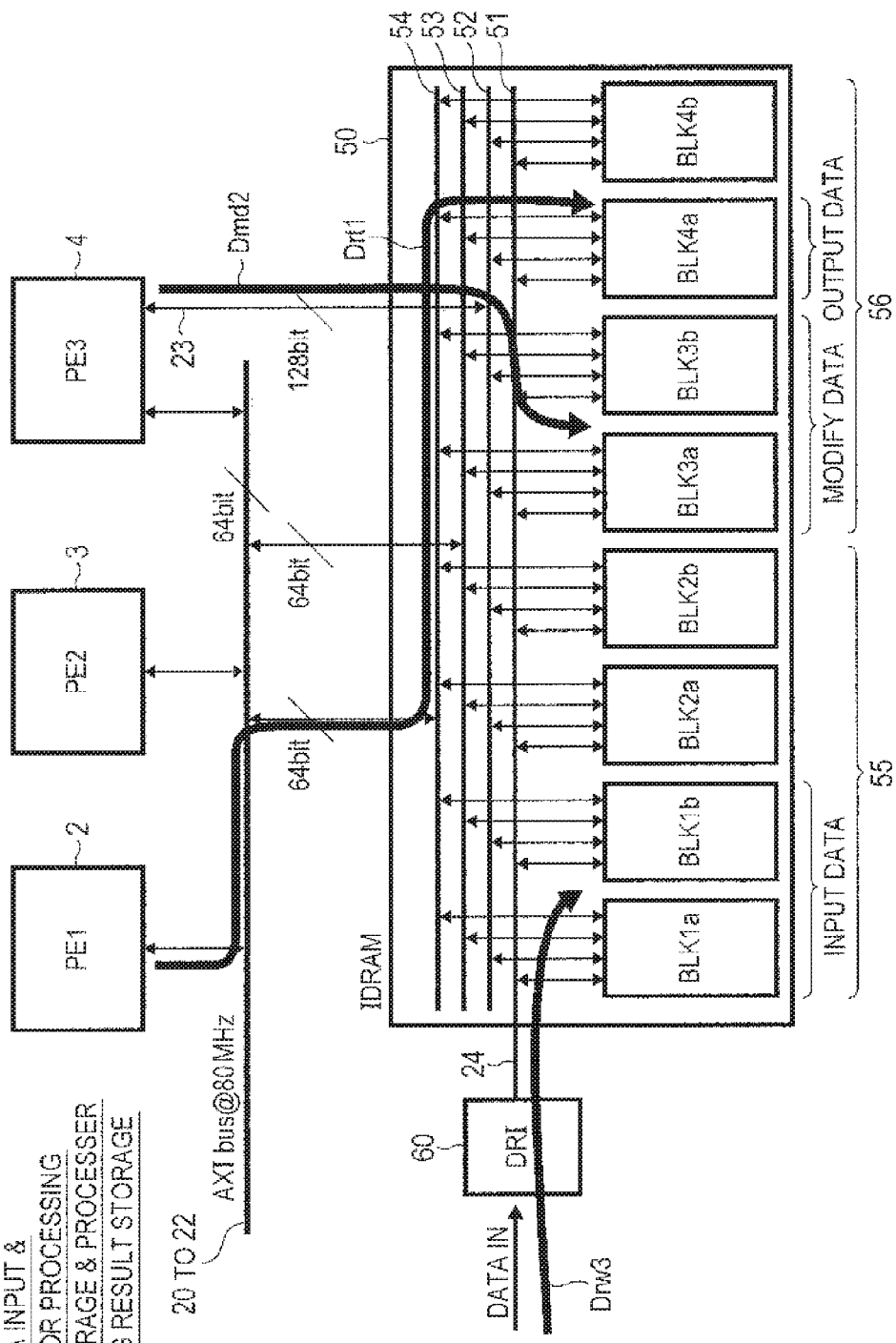
FIG. 10 is an explanatory view which illustrates a form of access with the IDRAM in the case that Step 1, Step 3, and Step 5 in FIG. 5 are parallelized.

FIG. 10 illustrates a form of access with the IDRAM 50 in the case that Step 1, Step 3, and Step 5 (FIG. 5) are parallelized.

While DRI 60 continues to store externally supplied third data Drw3 in the second block BLK2a, BLK2b of the first memory 55 through the first memory local bus 51, the accelerator 4 further stores second intermediate result data Dmd2 as a result of the second data processing in the third block BLK3a, BLK3b of the second memory 56 through the accelerator bus 23 and the second memory local bus 52. Concurrently, the processor 2 stores first final result data Drt1 such as turning angle as a result of the third data processing in the fourth block BLK4a of the second memory 56 through the single master bus 21 and the third memory local bus 53. This means that after the process in FIG. 9, while primary data Drw3 is continuously fetched, the intermedia result data calculated by the accelerator 4 can be sent from the accelerator 4 and stored in the second memory 56 and also the final result data Drt1 calculated by the processor 2 can be stored in the second memory 56.

Figure 11:
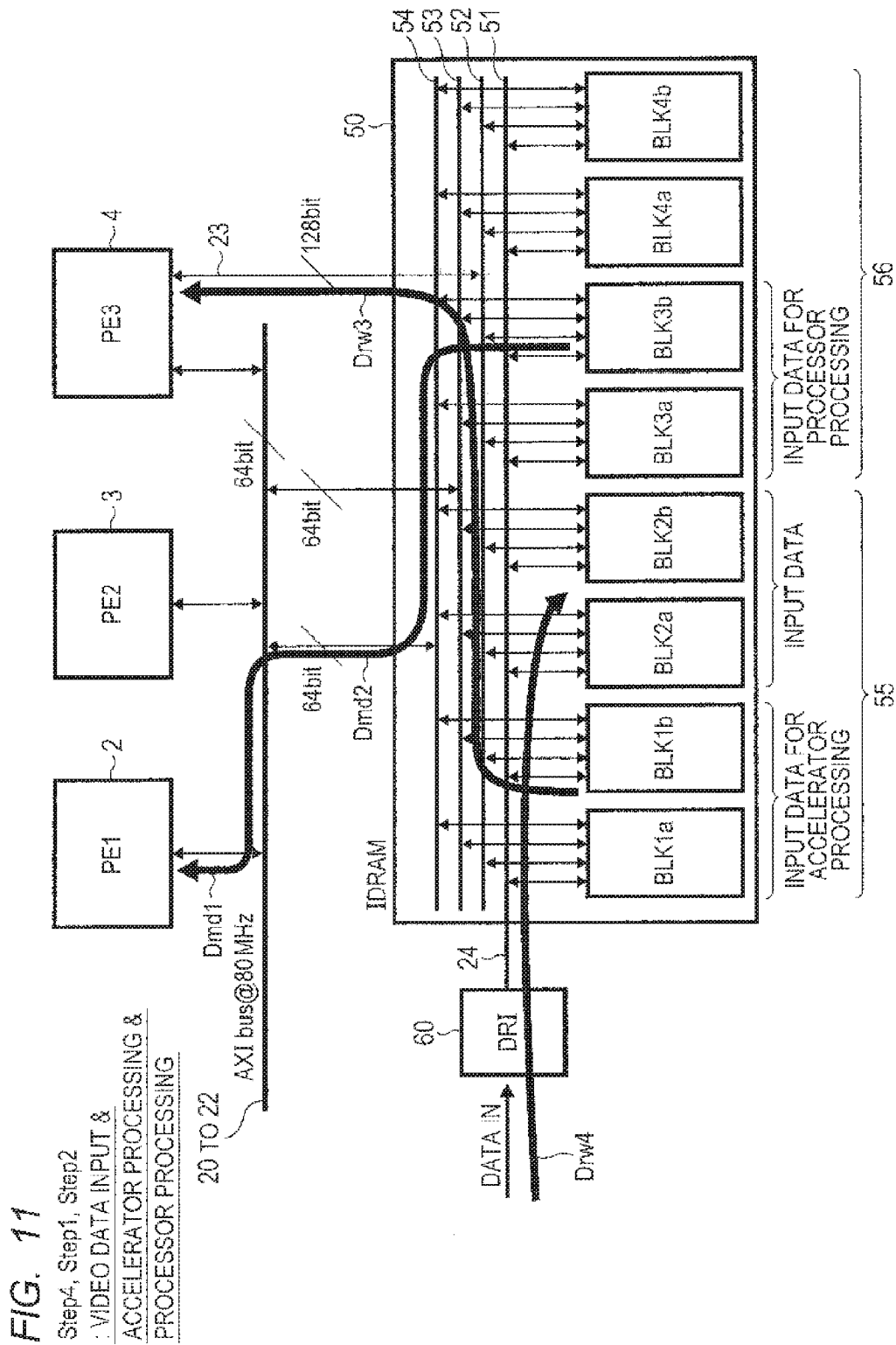
FIG. 11 is an explanatory view which illustrates a form of access with the IDRAM in the case that Step 1, Step 2, and Step 4 in FIG. 5 are parallelized.

FIG. 11 illustrates a form of access with the IDRAM 50 in the case that Step 1, Step 2, and Step 4 (FIG. 5) are parallelized.

DRI 60 further stores externally supplied fourth data Drw4 in the second block BLK2a, BLK2b of the first memory 55 through the first memory local bus 51, and concurrently the accelerator 4 further reads the third data Drw3 from the first block BLK1a, BLK1b of the first memory 55 through the accelerator bus 23 and the second memory local bus 52 to enable fourth data processing such as filtering and white line detection. At the same time, the processor 2 reads the second intermediate result data Dmd2 from the third block BLK3a, BLK3b of the second memory 56 through the third memory local bus 53 and the first single master bus 21 among the global buses to enable fifth data processing such as calculation of steering wheel turning angle. This means that after the process in FIG. 10, while other primary data is being fetched, previously fetched primary data can be supplied to the accelerator 4 and previously calculated intermediate result data Dmd2 can be supplied from the second memory 56 to the processor 2.

Figure 12:
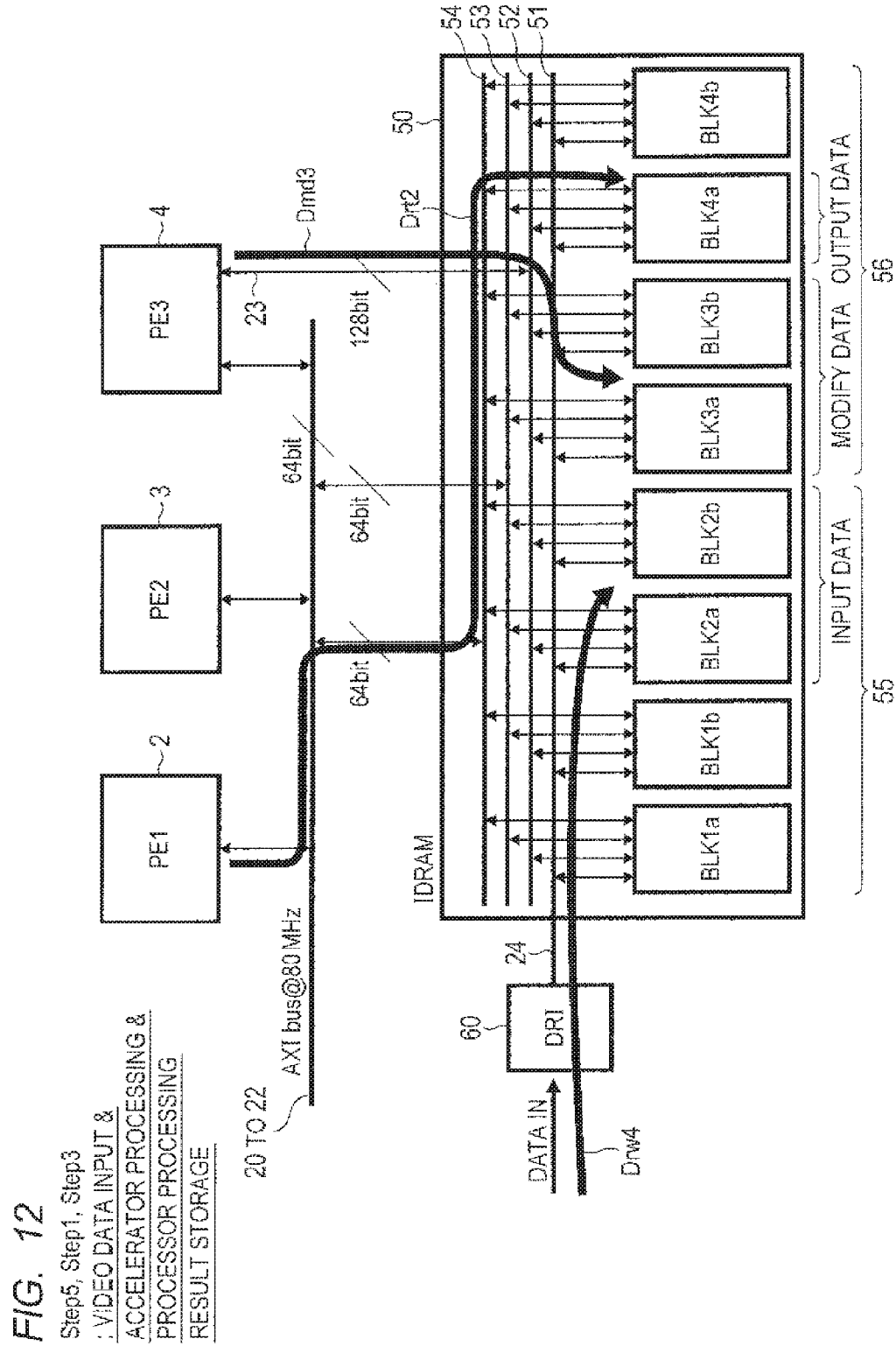
FIG. 12 is an explanatory view which illustrates a form of access with the IDRAM in the case that Step 1, Step 3, and Step 5 in FIG. 5 are parallelized.

FIG. 12 illustrates a form of access with the IDRAM 50 in the case that Step 1, Step 3, and Step 5 (FIG. 5) are parallelized.

While DRI 60 continues to store externally supplied fourth data Drw4 in the second block BLK2a, BLK2b of the first memory 55 through the first memory local bus 51, the accelerator 4 further stores third intermediate result data Dmd3 as a result of the fourth data processing in the third block BLK3a, BLK3b of the second memory 56 through the accelerator bus 23 and the second memory local bus 52. Concurrently, the processor 2 stores second final result data Drt2 such as turning angle as a result of the fifth data processing in the fourth block BLK4a of the second memory 56 through the single master bus 21 and the third memory local bus 53. This means that after the process in FIG. 11, while primary data Drw4 is continuously fetched, the intermedia result data calculated by the accelerator 4 can be sent from the accelerator 4 and stored in the second memory 56 and also the final result data Drt2 calculated by the processor 2 can be stored in the second memory 56.

After this, the processes shown in FIGS. 9 to 12 are repeated so that final result data according to sequentially entered new primary data can be sequentially obtained.

The final result data Drt1 and Drt2 such as turning angle which are obtained by the processes in FIGS. 10 and 11 and stored in the fourth block BLK4 are transferred to the ECU for control of the steering wheel or the like when necessary or periodically through the CAN 45 which is controlled by the processor 2 or 3.

As the processes in FIGS. 6 to 12 are performed, necessary processing tasks for the preventive safety system for collision prevention, etc. can be continuously carried out efficiently according to forward image data entered from the in-vehicle camera sequentially in time series. The results of processing performed successively to issue a collision warning according to forward image data entered sequentially in time series can be given through the in-vehicle network to the ECU in charge of the processing task to avoid collision.

The present invention is not limited to the above embodiment and obviously it may be embodied in other various forms without departing from the spirit and scope thereof.

The application range of the present invention is not limited to the field of data processing for a preventive safety system to avoid vehicle collision. The present invention may be applied to image recognition and feature extraction for other application purposes and also to image data compression and decompression. Furthermore, the data to be processed is not limited to image data, but the invention may be applied to processing of speech data and other various kinds of data. The data processing modules are not limited to two processors and one accelerator but the number of data processing modules and their combination may be changed as appropriate.

The number of local buses, the number of access ports, and the number of sub-blocks which enable asymmetric access with the memory unit are not limited to those in the above embodiment, but may be changed as appropriate.

What is claimed is:

1. A semiconductor device comprising:
   a memory unit having a first memory without an error correcting function, a second memory with an error correcting function, a plurality of access nodes and a plurality of memory local buses;
   a plurality of buses coupled to the plurality of access nodes of the memory unit; and
   a plurality of data processing modules each of which is configured to perform data processing,
   wherein the plurality of memory local buses include a first memory local bus, a second memory local bus, and a third memory local bus,
   wherein the plurality of data processing modules include a data processing module and an accelerator specialized in processing of specific data,
   wherein the plurality of buses include an accelerator bus coupled to the accelerator, a single master bus coupled to the data processing module and the third memory local bus, and a multi-master bus coupled to the accelerator and the data processing module, and
   wherein while externally supplied second data is stored in the first memory through the first memory local bus, the accelerator reads first data from the first memory through the accelerator bus and the second memory local bus to enable first data processing.

2. The semiconductor device according to claim 1, wherein the data processing module and the accelerator are data processing modules which each process a program and can asymmetrically access the first and second memories.

3. The semiconductor device according to claim 1, further comprising
   a direct memory input circuit which performs control to write data supplied from outside the semiconductor device in the first and second memories.

4. The semiconductor device according to claim 1, wherein while the externally supplied second data is stored in the first memory through the first memory local bus, the accelerator further stores first intermediate result data as a result of the first data processing in the second memory through the accelerator bus and the second memory local bus.

5. The semiconductor device according to claim 4, wherein while externally supplied third data is stored in the first memory through the first memory local bus, the accelerator further reads the second data from the first memory through the accelerator bus and the second memory local bus to enable second data processing and the data processing module reads the first intermediate result data from the second memory through the third memory local bus and the single master bus to enable third data processing.

6. The semiconductor device according to claim 5, wherein while the externally supplied third data is stored in the first memory through the first memory local bus, the accelerator further stores second intermediate result data as a result of the second data processing in the second memory through the accelerator bus and the second memory local bus and the data processing module further stores first final result data as a result of the third data processing in the second memory through the third memory local bus and the single master bus.

7. The semiconductor device according to claim 6, wherein while externally supplied fourth data is stored in the first memory through the first memory local bus, the accelerator further reads the third data from the first memory through the accelerator bus and the second memory local bus to enable fourth data processing and the data processing module reads the second intermediate result data from the second memory through the third memory local bus and the single master bus to enable fifth data processing.

8. The semiconductor device according to claim 7, wherein while the externally supplied fourth data is stored in the first memory through the first memory local bus, the accelerator further stores third intermediate result data as a result of the fourth data processing in the second memory through the accelerator bus and the second memory local bus and the data processing module further stores second final result data as a result of the fifth data processing in the second memory through the third memory local bus and the single master bus.

9. The semiconductor device according to claim 8, wherein the first to fourth data are forward image data supplied from an in-vehicle camera.

10. The semiconductor device according to claim 9, further comprising an in-vehicle network terminal interface, wherein the data processing module sequentially sends out the first final result data and the second final result data stored in the second memory through the in-vehicle network terminal interface.

* * * * *